(No Model.) 7 Sheets—Sheet 2.

H. H. CUMMINGS.
RIVET SETTING MACHINE.

No. 432,231. Patented July 15, 1890.

WITNESSES.
William H. Parry
E. G. Emanuel

INVENTOR.
Henry H. Cummings,
by Sylvenus Walker,
Attorney (No Model.)  7 Sheets—Sheet 4.

H. H. CUMMINGS.
RIVET SETTING MACHINE.

No. 432,231. Patented July 15, 1890.

WITNESSES
William H. Parry
E. G. Emanuel

INVENTOR.
Henry H. Cummings,
by Sylvenus Walker,
Attorney (No Model.)  7 Sheets—Sheet 5.
H. H. CUMMINGS.
RIVET SETTING MACHINE.

No. 432,231. Patented July 15, 1890.

WITNESSES. Fig. 11. INVENTOR.
William H. Parry, Henry H. Cummings,
E. G. Emanuel by Sylvenus J. Walker,
Attorney (No Model.) 7 Sheets—Sheet 6.

H. H. CUMMINGS.
RIVET SETTING MACHINE.

No. 432,231. Patented July 15, 1890.

WITNESSES.
William H. Parry
E. G. Emanuel

INVENTOR.
Henry H. Cummings,
by Sylvenus J. Walker,
Attorney (No Model.) 7 Sheets—Sheet 7.
H. H. CUMMINGS.
RIVET SETTING MACHINE.

No. 432,231. Patented July 15, 1890.

UNITED STATES PATENT OFFICE.

HENRY H. CUMMINGS, OF MALDEN, ASSIGNOR TO THE STANDARD GROOVE RIVET COMPANY, OF BOSTON, MASSACHUSETTS.

RIVET-SETTING MACHINE.

SPECIFICATION forming part of Letters Patent No. 432,231, dated July 15, 1890.

Application filed April 5, 1888. Serial No. 269,777. (No model.)

*To all whom it may concern:*

Be it known that I, HENRY H. CUMMINGS, of Malden, in the county of Middlesex and State of Massachusetts, have invented an Improvement in Rivet-Setting Machines, of which the following is a specification.

The object of my invention is to provide a machine for setting a peculiarly-formed rivet having a solid body provided with an annular groove, and having a conical hole formed in the point end thereof; and it consists in the construction, combination, and arrangement of the parts of the machine, as hereinafter described, and set forth in the claims, reference being had to the drawings, in which—

Figure 3:
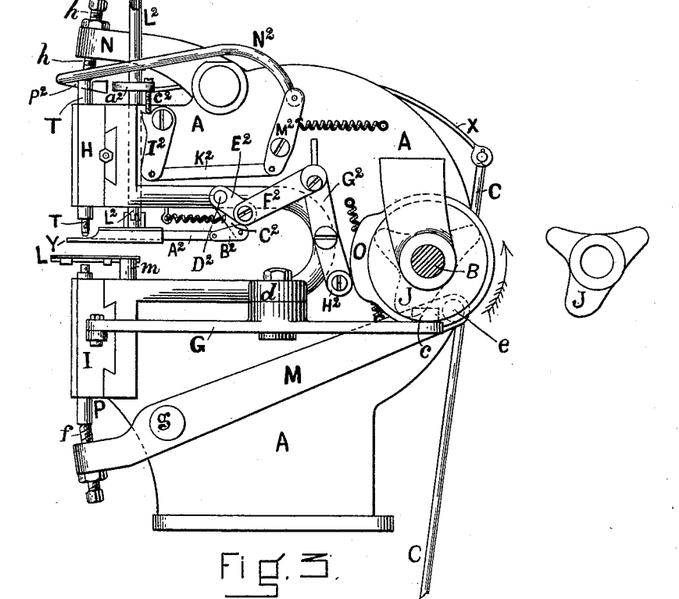
Fig. 3 represents a side elevation thereof.
Figures 4, 7, 8:
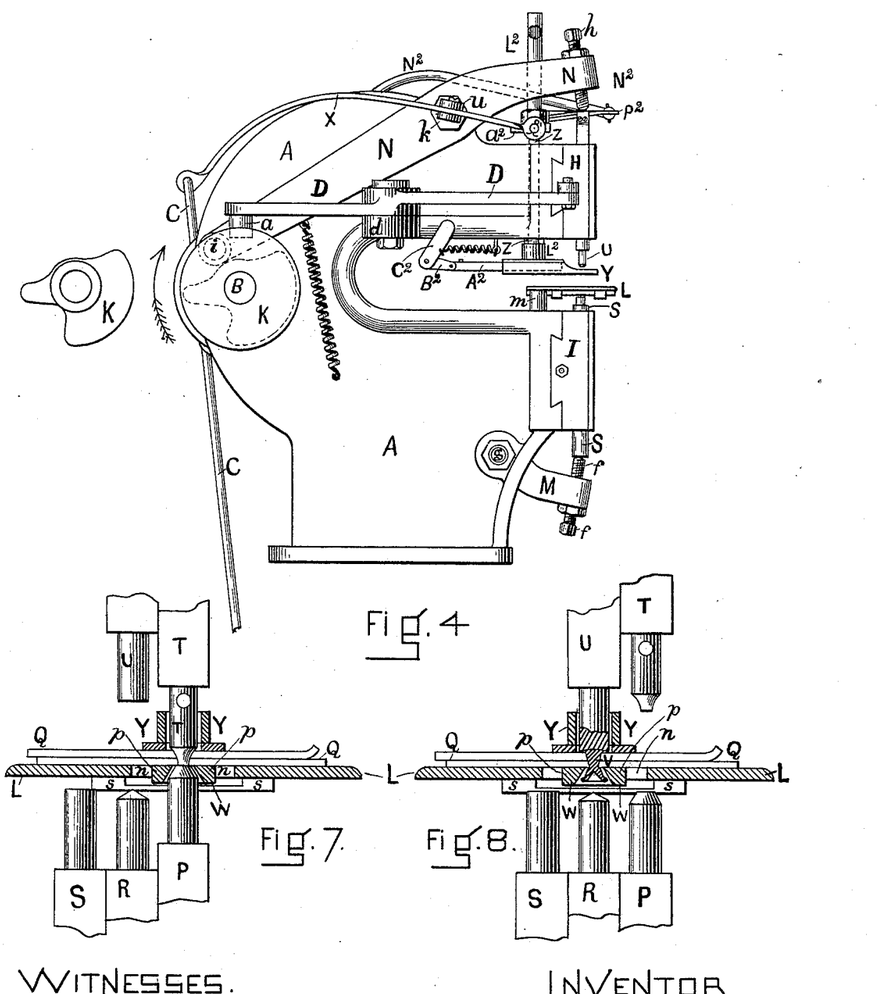
Fig. 4 represents the opposite side of the machine.
Fig. 7 represents a vertical sectional elevation of a detached portion of the rivet-setting mechanism.
Fig. 8 represents a similar view of the same, showing the rivet inserted through the pieces of material.

In the accompanying drawings, forming a part of the specification, and taken in connection therewith, A represents the main frame of the machine, upon which the several actuating mechanical devices are supported and mounted, said frame being, when in use, elevated and secured in position on a suitable bench or base of proper height for operation. This frame A may be constructed of cast-iron and provided with a main horizontal driving-shaft B, having suitable belt-pulleys and clutches for stopping and starting the movements of the machine by means of a foot-treadle actuated by the vertical connecting-rod C. (Shown in Figs. 3 and 4.) The treadle and bench, being of usual construction, need not be shown or further described. The said main horizontal driving-shaft B has secured thereon at each side of the main frame A a grooved actuating-cam E and F. The cam E, when rotated, actuates the pivoted horizontal lever-bar D, the rear end of which is provided with a friction-roll *a*, which operates in the irregular groove and on the upper side of the said cam E, and the opposite forward end of the said horizontal lever-bar D is pivoted or loosely connected with the upper sliding cross-head H, the said bar D being pivoted at about mid-length to the support *b*, secured to the main frame A, or forming a part thereof, as shown. The opposite cam F, when rotated, actuates the pivoted horizontal lever-bar G, the rear end of which is provided with a friction-roll *c*, which operates in the irregular groove and on the under side of the said cam F, and the opposite forward end of the said horizontal lever-bar G is pivoted or loosely connected with the lower sliding cross-head I, the said bar G being pivoted at about mid-length to the support $d$, which is secured to or forms a projection on the main frame A. The said main driving-shaft B has also secured thereon close to each side of the main frame A the eccentric actuating-cams J and K. The cam J, when rotated, actuates the pivoted cam-lever M, the rear end of which is provided with a friction-roll $e$, bearing against the lower face or periphery of the said eccentric-cam J, and the opposite forward end of said cam-lever M is provided with a set-screw $f$, the end of which has a bearing against the lower end of some one of the three vertical sliding setting-punches P R S, provided in the said lower sliding cross-head I, as shown, the said cam-lever M being pivoted near its forward end to the main frame A, near the bottom thereof, by means of a bolt and nut or screw-bolt $g$, as shown in Figs. 3 and 4. The said main driving-shaft B has also secured thereon at the same side of the main frame an eccentric O, as shown in Fig. 3, and which will be described hereinafter.

The eccentric-cam K, when rotated, actuates the pivoted cam-lever N, the rear end of which is provided with a friction-roll $i$, bearing upon the upper face of the said eccentric-cam K, and the opposite forward end of said cam-lever N is provided with a set-screw $h$, the end of which has a bearing upon the top end of the perforating-punch T or setting-punch U, which are fitted to slide vertically through the said upper sliding cross-head H, the said cam-lever N being pivoted to the main frame A, near the top thereof, by a screw-bolt $k$, as shown in Fig. 4. The said eccentric-cams J and K being shown in position by dotted lines in Figs. 3 and 4 and shown in full, removed, directly opposite in each of said Figs. 3 and 4, their operation will be understood.

Figure 5:
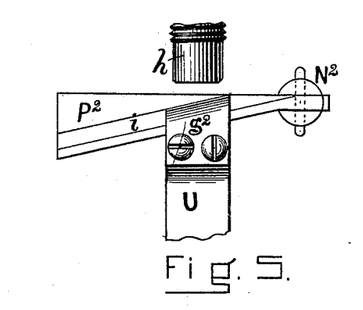
Fig. 5 represents an elevation of a detached portion, drawn on an enlarged scale.
Figure 6:
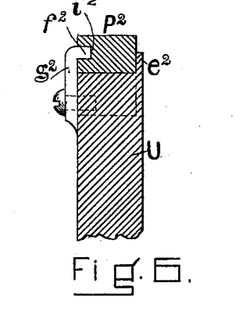
Fig. 6 represents a vertical sectional elevation of the same.
Figure 9:
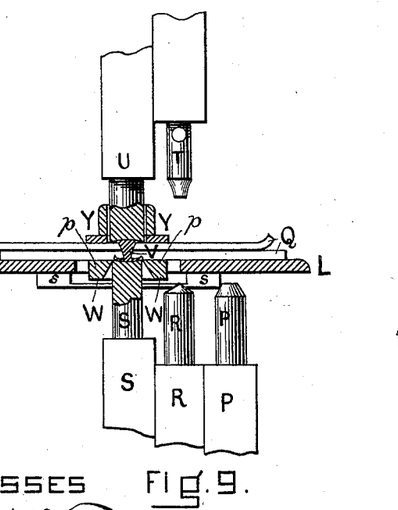
Fig. 9 represents a similar view, showing the rivet set or turned over and spread outward on the material, so as to secure the two pieces together.
Figure 10:
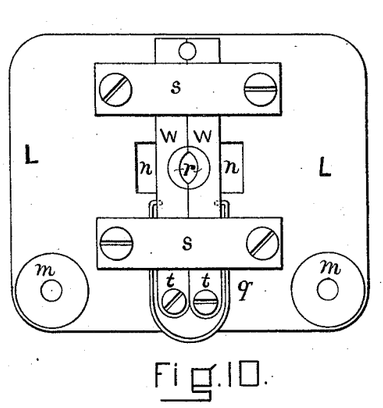
Fig. 10 represents an inverted plan of the table removed.
Figure 11:
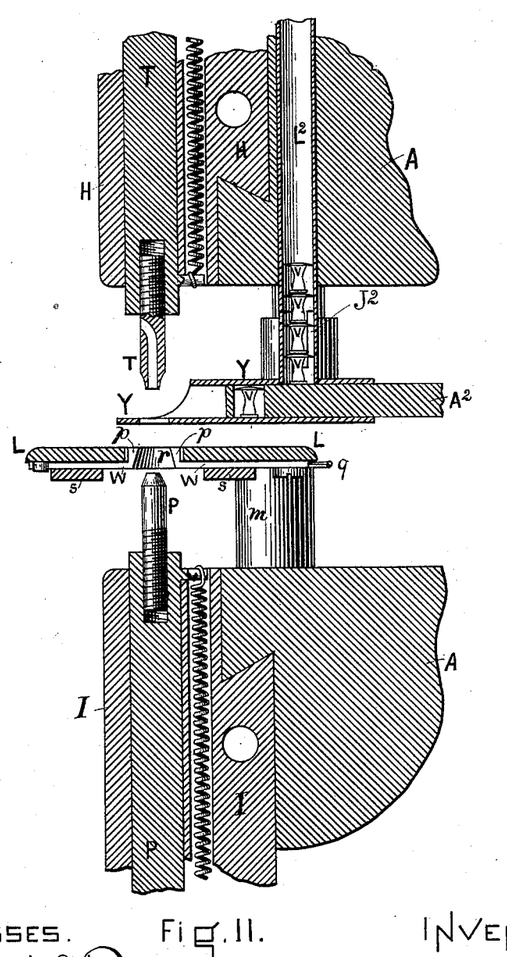
Fig. 11 represents a vertical central section through portions of the rivet-setting devices, showing rivets in elevation preparatory to being inserted and set.
Figure 12:
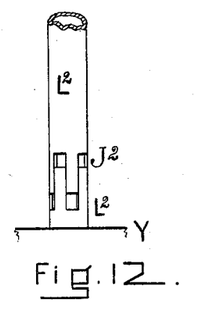
Fig. 12 represents an elevation of a jointed portion of the rivet-feed tube removed.

A small horizontal plate or table L is secured on suitable supports $m$, projecting from the forward portion of the lower projecting portion of the main frame A, as shown. This table L supports the material Q, being secured together by means of the rivets V, hereinafter more fully described. This table L is provided with a central opening $n$, and upon the under side has pivoted thereto a pair of spring-jaws W, provided on their meeting edges with countersunk projections $p$, which operate within the said opening $n$, when the beveled ends of the setting-punches P R or square-ended punch S are forced upward through the countersunk opening $r$, formed through the said projections of the jaws, so as to open the same when the said setting-punch S slides upward through the opening $r$ to finish the turning over of the hollow point end of the rivet V, as shown in Fig. 9. The jaws are opened or forced apart by the action of the punch, and are closed when the same is withdrawn by the bent-wire spring $q$, which has a bearing at each end with the outward edges of the said jaws W, as shown in Fig. 10. The said jaws are held in position with the under side of the said table L by means of the cross-bar guides $s\,s$, and are pivoted thereto by screws $t\,t$, passing loosely through the rear ends thereof, as shown. The leather or other pieces of material to be united are placed in position on the said table L, and then the presser-foot Y is forced downward upon the same by means of the treadle, (not shown,) which connects with the lower end of the vertical treadle-rod C, the upper end of which is pivoted to the rear end of the curved spring-bar X, which is pivoted to a bearing-block or projecting stud $u$, or the stud $u$ may form the pivot, and its outward end provided with an opening or slot to receive the said spring-bar X, as shown. The forward end of the spring-bar X is pivoted or loosely connected to the upper end of the vertical sliding bar Z, the lower end of which is secured to the top of the said presser-foot Y, so that when the treadle is pressed downward by the foot of the operator the vertical rod C is forced upward and the forward end of the spring-bar downward, which carries the sliding-bar Z downward within the vertical hole fitted through the upper portion of the frame A to receive it. The said sliding bar Z is shown by dotted lines in Fig. 4. The said presser-foot Y is formed with a longitudinal opening through it, and within this opening is fitted a horizontal sliding carrier $A^2$, provided near its forward end with a vertical hole adapted to receive a rivet V, as shown in Fig. 11, in the operation of setting the same, as hereinafter described. This horizontal sliding carrier $A^2$ is pivoted at its rear end to the short pivoted link or bar $B^2$, which is pivoted to the lower end of the arm $C^2$, the upper end of which is rigidly secured to the end of the short rock-shaft $D^2$, which passes loosely through a hole in the frame A to receive it and permit a slight rotary or rocking motion therein, and to the opposite end of this rock-shaft $D^2$ is secured in a permanent manner the upper end of the arm $E^2$, the lower end of which is pivoted to the connecting-bar $F^2$, which bar $F^2$ is likewise pivoted to the upper end of the actuating lever-bar $G^2$, which is pivoted at about mid-length to the said frame A of the machine, and its lower end provided with a friction-roll $H^2$, which has a bearing upon the periphery of the eccentric O, as shown in Fig. 3. Now it will be seen that by the rotation of the said eccentric O its action upon the connected levers, arms, rock-shaft, and pivoted bars, as above described, and intermediately connected with the said sliding carrier $A^2$, will cause the same to receive a horizontal reciprocating movement, so as to carry forward a rivet V, which has been deposited within the hole or opening prepared to receive it, from the lower end of the vertical feed-tube $L^2$, when the hole or opening is brought directly beneath the same. The lower end of the feed-tube $L^2$ is connected with the top of the presser-foot Y, and in order to permit the presser-foot to be carried downward upon pieces of material Q, as shown in Figs. 7, 8, and 9, I provide the lower portion of the said feed-tube with a sliding joint $J^2$, as shown in Figs. 11 and 12. By this means the presser-foot may be forced down, as above described, to rest on the material about to be secured by the rivets, and by means of the sliding joint in the said feed-tube the rivets contained therein, as shown, are kept in position, resting one upon the top of the sliding carrier as it is pushed forward, as shown in Fig. 11, and the other rivets contained in said tube resting upon each other in a vertical column, as shown. The bottom rivet at each alternate movement, or each time the carrier is drawn backward into position beneath the tube, falls into the hole or cavity, so as to be carried forward and inserted through the material, as hereinafter described. To the upper end of the said vertical sliding bar Z is secured a short horizontal cross-plate $a^2$, which has an opening through which the vertical feed-tube $L^2$ passes loosely, so as to permit the said cross-plate $a^2$ to slide up or down thereon when the presser-foot is raised or lowered, as above described. This cross-plate $a^2$ is provided with an adjustable set-screw $c^2$, the lower end of which projects downward and rests on the shoulder provided near the upper end of the actuating-arm $I^2$, which is pivoted to the upper portion of the main frame A, and its lower end is pivoted to the horizontal connecting-bar $K^2$, the opposite end of which is pivoted to the lower end of the lever-arm $M^2$, which arm is pivoted near its lower end to the same portion of the main frame A, and the upper end of the said lever-arm is pivoted to the rear end of the curved actuating-rod $N^2$, the forward end of which is pivoted or loosely connected to the small end of the horizontal sliding wedge $P^2$, which is supported above the main frame A by the upwardly-projecting end of the before-described setting-punch U, upon which it slides when the presser-foot Y is moved. The said wedge $P^2$ is held in position thereon and guided in its movements by means of a projection $e^2$, formed on the punch U, and a guide-piece $g^2$, the lower end of which is firmly secured to the opposite side of the punch, and its upper end provided with an incline projection or lip $f^2$, which fits within a groove $i^2$, formed in the side of the wedge, and parallel with the lower side or bearing-face of the wedge, as shown in Figs. 5 and 6. It will be seen and understood that the movement of this wedge $P^2$ corresponds with the movement of the said presser-foot Y, so that when the thickness of material to be secured together by means of the rivets V varies the presser-foot when brought to bear thereon must move in a like ratio or manner corresponding thereto.

Now in order that the rivet V, having been inserted through the material, as hereinafter described, and the lower projecting point end is about to be spread or turned outward and upset against the under side of the material, it is essential that the lower end of the said setting-punch U should have a firm bearing upon the head of the rivet in all cases, and in order to provide for the varying thicknesses of material being united this wedge $P^2$ is brought to bear accordingly by introducing it between the lower end of the set-screw $h$, which projects from the forward end of the cam-lever N and the upper end of the said setting-punch U more or less, as required to insure the same pressure to be brought to bear in all cases, as shown in Figs. 8 and 9, and hereinafter described.

Figure 14:
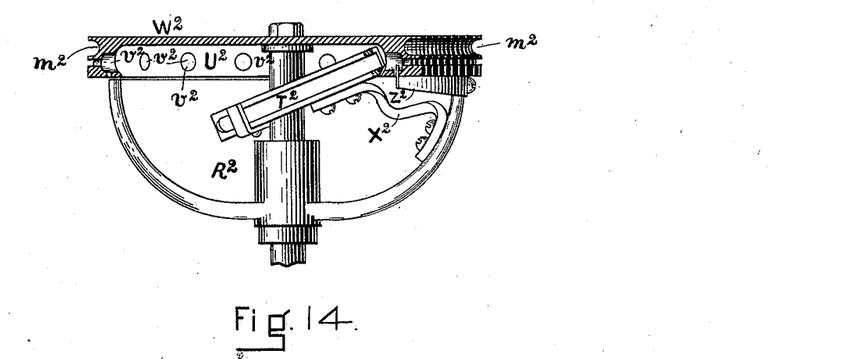
Fig. 14 represents a horizontal sectional plan of the feed-wheel, hopper, and chute for delivering the rivets to the vertical feed-tube. (Shown in section in Fig. 11.)
Figure 15:
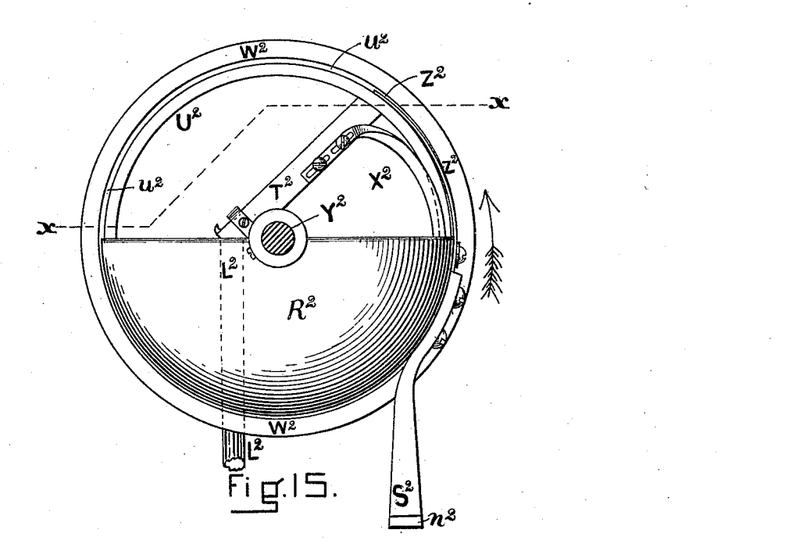
Fig. 15 represents a side elevation of the hopper, feed-wheel, and chute, the dotted lines *x x* showing the line of section taken in Fig. 14.
Figure 16:
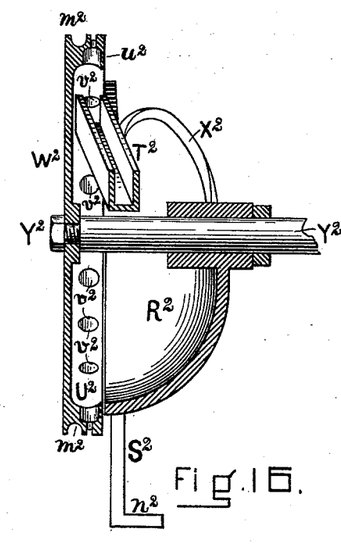
Fig. 16 represents a vertical central sectional elevation of the hopper, feed-wheel, and chute.
Figure 17:
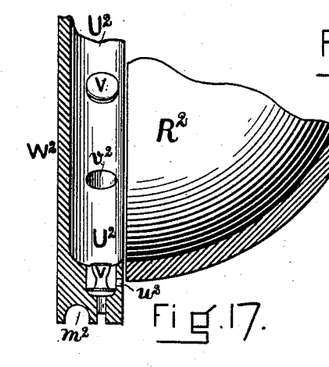
Fig. 17 represents a vertical section through a portion of the bottom of hopper and feed-wheel, showing rivets within the recesses or holes formed in the interior of the rim of the feed-wheel, to be carried up and delivered into the chute, drawn on an enlarged scale.
Figure 18:
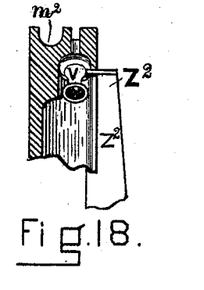
Fig. 18 represents a vertical section through a portion of the top of feed-wheel, showing a rivet held therein by means of a flat spring acting upon the head of the rivet.

The rivets V to be set by this machine are provided with a conical hole in the point end and an annular groove in the body thereof, as shown. These rivets are placed in the semicircular hopper $R^2$, which is supported above the setting devices above described, and is secured in position on the top of the main frame A by means of the vertical bracket or support $S^2$, the upper end of which is secured to the outside of the hopper, as shown in Fig. 15, and the lower end is provided with a right-angled projection $n^2$, which is bolted firmly to the main frame A at the point $r^2$. (Shown in Figs. 1 and 3.) The upper end portion of the said vertical feed-tube $L^2$ passes upward through the bottom portion of the said hopper $R^2$, and its open upper end is connected with an opening formed in the bottom side of the lower end of the inclined raceway $T^2$, the upper end of which terminates in close proximity to the interior rim $U^2$ of the rotary elevator-wheel $W^2$, and is secured in position by the curved bracket $X^2$, as shown in Figs. 14 and 15. This rotary elevator-wheel $W^2$ is provided with a horizontal axle or journal $Y^2$, fitted in bearings provided on the top of the hopper $R^2$, as shown, and the interior of the rim $U^2$ is provided with a series of cavities $v^2$, which are of such size and depth as to receive therein one of the said rivets V, as shown in Figs. 17 and 18, which show the rivets on end, the cavities being of such size and formation as to permit a rivet V to fall therein either end up, and in order to elevate the rivets and deliver the same into the top end of the said vertical feed-tube $L^2$ with their point ends downward, as shown and described, I provide the rotary elevator-wheel $W^2$ with a flat curved holding finger-plate $Z^2$, the inward edge of which is fitted within the annular groove $u^2$, provided in the outside or inward side face of the said rim $U^2$, as shown. Now it will be seen and understood that the rivets are liable to fall into the said cavities one end up or the other, or the head end upward, or the point end upward, in equal proportions. So, in order that only those that fall into the cavities with their point ends upward may be elevated and delivered into the said raceway $T^2$ the said curved finger-plate $Z^2$ projects within the said groove $u^2$, which intersects the said cavities just sufficiently to pass beneath or in contact with the under side of the head of the rivet, as shown in Fig. 18, the rivet is retained thereby within the cavity until elevated some distance above the horizontal plane or axis of the wheel, so that when the head of the rivet is carried past the upper end of the curved finger-plate $Z^2$ it will fall out into the race-way point end downward, or in proper position to enter the tube to be inserted through the two pieces of material to be secured together by means of such rivets, as shown and above described. The rivets which fall into the cavities with their head ends upward, as shown at top of Fig. 17, will not remain therein until carried upward to the point opposite the upper end of the raceway, but will fall out and drop back into the hopper, as the finger-plate will not hold them in position when carried up by the rotation of the said elevator-wheel. This elevator-wheel $W^2$ is provided with a peripheral groove $m^2$ to receive a driving-belt connecting with a rotary pulley on the main or counter shaft, (not shown,) or as desired.

Figure 13:
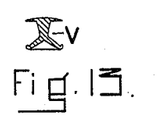
Fig. 13 represents a section of a rivet, showing the form of the same when partially turned over and removed from the material.

The operation of the machine is as follows: Power being communicated to the main driving-shaft, so as to rotate the several cams secured thereon when the treadle is operated by the foot of the attendant, the pieces of material which are to be secured together having been placed in position on the table, the presser-foot is brought to bear upon the top surface thereof. At the same time the anvil-punch P is forced upward into contact with the under surface of the material, and then the cutting-punch T is forced downward, cutting a hole through the pieces of material, as shown in Fig. 7. When the said punch T is released, a suitable coiled spring returns the punch to its normal position, as shown in Fig. 11. Then the horizontal sliding rivet-carrier is forced forward, carrying a rivet V directly over the hole in the material. Then the upper sliding cross-head H is moved so as to bring the setting-punch U directly over the head of the rivet. It is then forced downward upon the head of the rivet and pushes it through the pieces of material, as shown in Fig. 8. Then the lower sliding cross-head I is moved so as to bring the conical end of the setting-punch R directly beneath the hollow point end of the said rivet, when the said punch is forced upward and partially opens or spreads the end of the rivet, as shown in Fig. 13, (removed from the material.) Then the said punch is carried downward to its normal position. Then the said cross-head I is moved so as to bring the setting or finishing punch S directly beneath the lower end of the rivet. Then this punch is forced upwardly in contact with the rivet, and the end thereof is further opened or spread outward and turned over upon the surrounding surface of the under side of the material, so as to complete the fastening, as shown in Fig. 9.

It will be seen and understood that the several actuating levers and arms, and also the several punches, are provided with suitable coiled springs to operate in conjunction with the several moving parts, so as to retain the same in proper positions. The action and operation of such springs, being old and well understood, need not be further described, as those illustrated in the drawings will indicate like action and operation of such duplicates thereof as are omitted.

Figure 1:
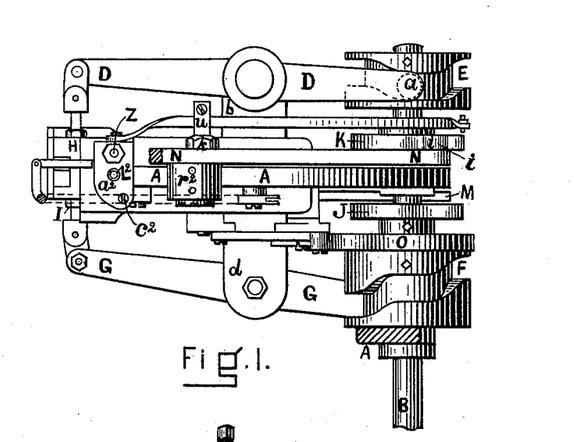
Figure 1 represents a plan of a rivet-setting machine constructed according to my invention, with the hopper and rivet-feeding mechanism removed.
Figure 2:
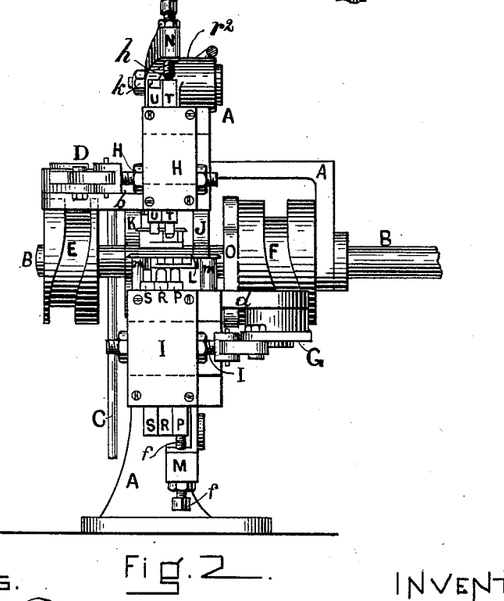
Fig. 2 represents a front elevation of the same.

It will be observed in Fig. 1 that a portion of the forward end of the cam-lever N is broken away, so as to show those parts directly beneath; also, in Fig. 2 it will be seen that the forward end portion of the curved actuating-rod $N^2$ is broken away and likewise omitted. As each part is clearly and fully shown in the other figures, their action and relative positions will be readily understood.

Having thus described my invention, what I claim is—

1. In a rivet-setting machine, the combination of the actuating-cams E and F, pivoted lever-bars D and G, sliding cross-heads H and I, setting-punches P R S, perforating-punch T, and setting-punch U, cam-levers M and N, eccentric actuating-cams J and K, table L, and presser-foot Y, arranged to operate as described.

2. In a rivet-setting machine, the combination, with the presser-foot Y, of the sliding carrier $A^2$, bar $B^2$, arm $C^2$, rock-shaft $D^2$, arm $E^2$, connecting-bar $F^2$, actuating lever-bar $G^2$, and eccentric O, as described.

3. In a rivet-setting machine, the combination, with the presser-foot Y, of the treadle-rod C, pivoted spring-bar X, vertical sliding bar Z, plate $a^2$, having set-screw $c^2$, actuating-arm $I^2$, bar $K^2$, lever-arm $M^2$, curved actuating-rod $N^2$, and sliding wedge $P^2$, as described.

4. In a rivet-setting machine, the combination, with the presser-foot Y, of the feed-tube $L^2$, having a sliding joint $J^2$, hopper $R^2$, feed-wheel $W^2$, and raceway $T^2$, as described.

5. In a rivet-setting machine, the combination, with the hopper $R^2$, of the feed-wheel $W^2$, having a rim $U^2$, provided with cavities $v^2$ and annular groove $u^2$, the curved finger-plate $Z^2$, and raceway $T^2$, as described.

HENRY H. CUMMINGS.

Witnesses:
SYLVENUS WALKER,
WILLIAM H. PARRY.